Oct. 15, 1968
E. W. MOLLOY
3,406,109
POLAROGRAPHIC SENSOR
Filed July 20, 1964
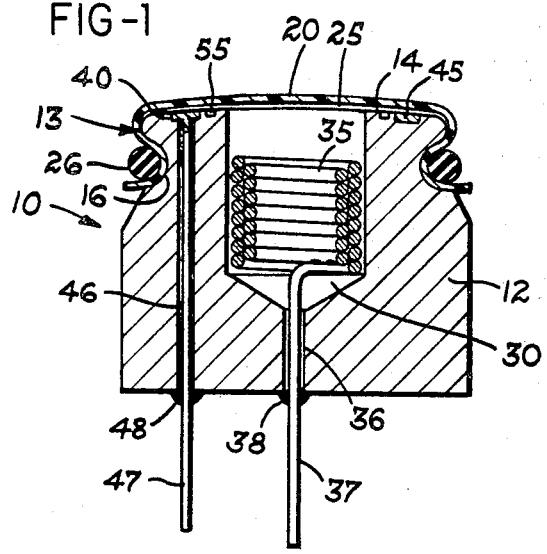
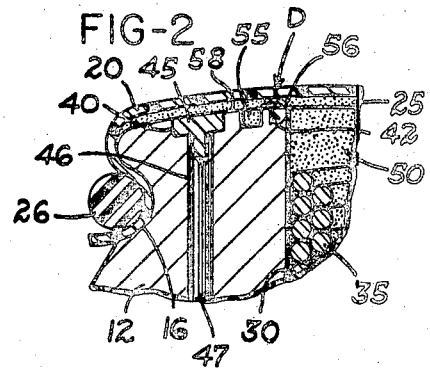
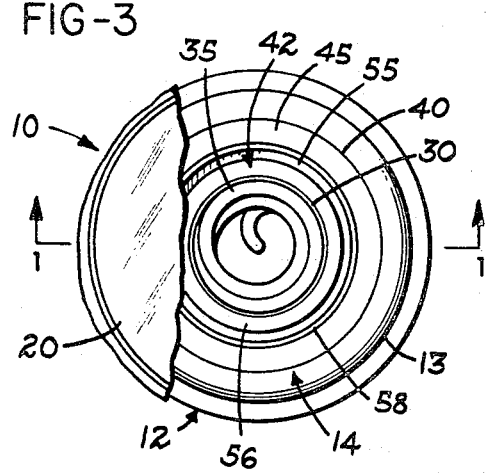
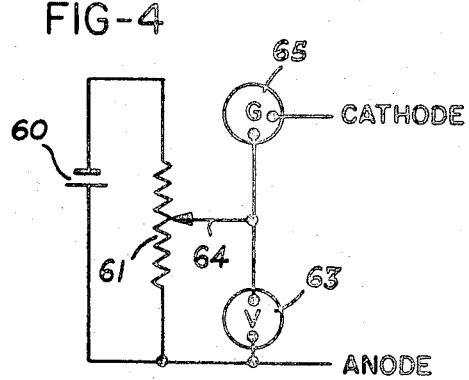
INVENTOR.
EVERETT W. MOLLOY
BY
*Marchal, Biebel, French & Bugg*
ATTORNEYS 3,406,109
POLAROGRAPHIC SENSOR
Everett W. Molloy, Yellow Springs, Ohio, assignor to The Yellow Springs Instrument Company, Inc., Yellow Springs, Ohio, a corporation of Ohio
Filed July 20, 1964, Ser. No. 383,768
3 Claims. (Cl. 204—195)

ABSTRACT OF THE DISCLOSURE

A sensor cell for polarographic analysis includes an anode and a cathode supported in an electrically insulating body having a convex face with a membrane spaced from the face to form an electrolyte chamber, the membrane being permeable to the constituent being measured. The chamber, which is of capillary dimensions, is filled with an electrolyte which contacts both the anode and cathode, which may be of silver and gold, respectively. The cathod is annular in shape and spaced from the anode, the latter surrounding the cathode and being supported on the working face. An annular land is provided on the working face between the anode and cathode so that as the anode is consumed, the anodic material tends to deposit on the land, a groove being provided adjacent the land to promote deposition of the anodic products on that portion of the land spaced from the cathode. In this way, a sensor is provided which is relatively insensitive to mechanical shock, possessing a faster response time, the relatively fast recovery from mechanical shock, if it occurs.

---

This invention relates to an electrochemical device and more particularly to an improved polarographic sensor cell for use in quantitative analysis of chemical constituents and particularly of oxygen.

Polarographic analysis is becoming increasingly popular as an analytic method because of the accuracy and relative simplicity of the equipment involved. This type analysis relies upon electrochemical phenomenon in that the substance which is desired to measure affects the electrical characteristics of a sensor cell which includes an anode and a cathode and an electrolyte, the latter forming an electrically conductive path between the anode and the cathode.

Polarographic cells are known, which include a "captive electrolyte" by the use of a membrane or barrier which permits migration therethrough of various materials depending on the nature thereof. The membrane is composed of material which permits passage of gaseous material into an electrolyte which is on one side of the membrane and in contact with the electrodes forming the sensor.

For example, and not to be construed as a limitation on the present invention, in the case of oxygen analysis, the oxygen moves through the membrane and the electrolyte to the cathode. The amount of current which flows through the sensor cell is proportional to the amount of oxygen to which the membrane is exposed, that is, the indication given by the cell is the oxygen pressure. Since oxygen is consumed at the cathode, the oxygen pressure inside the membrane approaches zero at the cathode and accordingly the force causing the oxygen to diffuse through the membrane can be made nearly proportional to the absolute pressure of oxygen outside the membrane. If oxygen outside the membrane increases, more oxygen diffuses through the membrane and more current flows through the cell. The rate of diffusion through the membrane is directly proportional to pressure, and the oxygen-cell current relationship obeys stoichiometric laws. Thus a linear relationship exists between external oxygen pressure and cell current.

By providing a relatively thin film of electrolyte, preferably of capillary dimensions in cross-sectional thickness, the response time of the sensor cell is decreased, that is, the response is faster because the oxygen need not migrate through a relatively large body of electrolyte to reach the cathode.

It was observed during operation of the above described sensor cell utilizing a silver anode that electrical shorting or erroneous electrical indications sometimes occurred which were believed attributable to chemical activity of the anode material resulting in a build up of anodic material in the area around the cathode. The tendency of anodic material to deposit or to build up in the vicinity of the cathode and the chemical nature of the deposit as well as the rate of deposition thereof depend on the structure of the sensor, the electrical conditions imposed and the composition of the electrolyte. It has been observed in the commercially available "captive electrolyte" type oxygen sensors that the deposit appears to grow from the edge of the cathode toward the anode, and after a period may bring about an electrical short between the anode and cathode rendering the sensor inoperative. If the deposit is not sufficiently great to cause electrical shorting, there is an eorroneous electrical indication since the process of deposition from the electrolyte solution causes current flow.

While the above described cell operates satisfactorily in polarographic measurement under certain conditions there have been variations in response particularly in instances in which the sensor cell is subjected to mechanical shock either by way of turbulence in the material being measured, or because of bumping or dropping of the sensor head. Since the sensor membrane is separated from the electrodes by an electrolyte, and because the membrane is deformable, the cross-sectional dimension of the electrolyte may vary in response to shock. Mechanical shock tends to increase the response time since time must be allowed for shock recovery, and variation in the cross-sectional dimension of the electrolyte as a result of shock may adversely affect the sensor reading momentarily.

In accordance with the present invention, a sensor cell structure is provided exhibiting improved insensitivity to mechanical shock, faster recovery from mechanical shock, if it occurs, and faster response by maintaining the cross-sectional thickness of the electrolyte relatively small and of capillary dimensions. Additionally, electrical shorting or erroneous electrical indications attributable to deposition of an anodic material in the area of the cathode are substantially reduced thus providing a longer useful life of the sensor cell.

Accordingly, it is a primary object of the present invention to provide an improved sensor cell for polarographic analysis which is relatively stable to mechanical shock, fast in response during use, and which exhibits relatively fast recovery from mechanical shock.

Another object of the present invention is the provision of a sensor assembly including a supporting body having a working face, a pair of electrodes supported within the body and a membrane spaced a relatively small distance from the working face, the space between the membrane and working face being substantially completely filled with an electrolyte which provides electrical contact between the electrodes, and wherein the supporting body is so constructed and arranged that the portion thereof between said electrodes cooperates with the membrane to provide a pocket or mass of electrolyte which is substantially greater in thickness than the relatively small distance between the working face and the membrane thereby reducing the rate of deposition and accumulation of conductive material tending to cause erroneous electrical indications or electrical shorting of the electrodes.

Another object of the present invention is the provision of a mechanically stable sensor assembly including a membrane, a supporting body and a cathode and an anode, the space between the membrane and the supporting body being substantially completely filled with an electrolyte, and wherein the portion of the membrane immediately adjacent to the cathode is under relatively high tension to maintain a stable electrolyte thickness in the area of the cathode.

A further object of the present invention is the provision of a sensor assembly of the type above described including a cathode in the form of a ring which is positioned in the working face of a supporting body and spaced from the anode, and wherein a membrane is spaced a relatively small distance from the working face by an electrolyte contacting both the anode and cathode, the membrane in the area of the cathode being under relatively high tension to minimize the effects of mechanical shock, and the supporting body being so constructed and arranged with respect to the membrane as to provide a thickness of electrolyte between the cathode and anode which is substantially greater than the thickness of the electrolyte facing the cathode thereby reducing the rate and amount of deposited anodic material between the anode and cathode.

A further object of the present invention is the provision of a sensor cell for use in polarographic measurement having a relatively long service life and which is relatively insensitive to mechanical shocks.

Other objects and advantages of the present invention will be apparent from the following description, the accompanying drawing and the appended claims.

In the drawing—

FIG. 1 is a view in section along the line 1—1 of FIG. 3 of the sensor cell in accordance with the present invention;

FIG. 2 is an enlarged fragmentary view of a portion of the sensor cell of the present invention;

FIG. 3 is a plan view of the sensor cell shown in FIG. 1 with a portion of the membrane broken away showing the relative position of the elements of the sensor cell of the present invention; and FIG. 4 is a schematic diagram of a simple circuit in which the sensor cell of the present invention may be used.

Referring to FIGS. 1 to 3 of the drawing, which illustrate a preferred embodiment of the present invention, the sensor cell 10 includes an electrically insulating support body 12 of plastic, for example, an acrylic or methacrylic plastic. The supporting body 12 is preferably cylindrical in shape, having at one end thereof a portion of reduced diameter 13. The end of the supporting body near portion 13 is provided with a working face 14 which is preferably convex in shape. A groove 16 is provided about the outer periphery of that portion of the body which is of reduced diameter and spaced from the working face 14. Positioned over the working face 14 is a membrane 20 which is permeable to the constituent being measured and which cooperates with the supporting body 12 to provide a generally convex chamber 25 between the opposed surfaces of the membrane 20 and the working face 14 which is relatively thin in cross-section.

The membrane is a relatively thin sheet of chemically inert material capable of permitting passage of gaseous materials and particularly the material being measured, and in the case of oxygen determination the membrane may be fluorinated ethylene propylene or other suitable material. Under some circumstances it may be desirable to use natural materials or plastics such as cellophane or polyethylene, or polytetrafluoroethylene. The membrane 20 is maintained in fixed position relative to the supporting body 12 by an O-ring 26 or other suitable means received in the groove 16 formed around the outer periphery of portion 13 of the body.

The body 12 includes a well 30 which communicates with the chamber 25 between the membrane and the working face, and the well 30 is preferably arranged in the center of the cylindrical member as shown. Positioned within the well 30 is an anode 35 which is in the form of a double spiraled coil or helix of wire in order to provide maximum anode surface area. The anode may be silver and the like or any of the other conventional materials used in polarographic cells. The body 12 includes a passage 36 through which passes a lead-in member 37 which may be affixed in electrical communication with the coiled anode 35 and which is preferably integral therewith to eliminate any interfering electrochemical reaction due to the difference in chemical make up of the material constituting the anode coils, the solder, if one is used, and the lead-in member. A fluid-tight seal is provided between the lead-in 37 and the supporting body by an epoxy resin cement 38.

Formed in the working face 14 of the supporting body is an annular channel 40 which is of a diameter larger than the diameter of the well 30 so as to provide a generally annular land 42 on working face 14 between the well 30 and the channel 40. Received in the channel 40 is a cathode 45 which is in the form of a flat generally annular ring with the surface contour thereof being generally convex to match the convex contour of the working face. The cathode may be of gold or any other metal customarily used as cathodes in a polarographic cell. The body includes a second passage 46 through which passes a lead-in member 47 preferably formed integrally with the cathode ring 45 and sealed to the support body 12 by an epoxy resin cement 48 to provide a fluid-tight seal around the lead-in member 47.

Referring specifically to FIG. 2, which shows a fragmentary portion of the sensor cell on a much enlarged scale, the chamber 25 and the communicating well 30 are filled with an electrolyte 50 shown as the stippled portion, the electrolyte providing an electrical path between the cathode 45 and the anode 35. The electrolyte may be any suitable material, and in accordance with the present invention a relatively concentrated solution of potassium chloride in water has been found satisfactory in the case of oxygen analysis. A solution of about 10 to 20 grams of potassium chloride per 100 milliliters of water operates satisfactorily with the sensor cell of this invention.

The chamber 25 is preferably relatively thin in cross-sectional dimension, for example of capillary dimensions or of the order of about .005 inch in thickness as to provide relatively quick response to the constituent being measured. By maintaining the layer of electrolyte relatively thin, the distance through which the constituent being measured must travel to the cathode is substantially reduced. The use of a relatively thin film of electrolyte tends, however to render the sensor cell sensitive to mechanical shocks which produce erroneous electrical readings and which may cause a delay between readings until the sensor cell has had an opportunity to recover from the mechanical shock.

In accordance with the present invention, mechanical stability of the sensor cell, increased insensitivity to mechanical shock and speed of response are achieved by the use of a convex working face which supports the cathode which is in the form of a flat ring as previously described, and by providing a membrane which is maintained in tension particularly the portion of the membrane which is opposite the cathode ring. The electrolyte which fills the chamber possesses a surface tension and when such a liquid is confined in the space between the membrane and the working face, the liquid exerts a pressure which tends to increase the distance between the working surface and the opposed surface of the membrane. If the membrane is stretched over the working face and under tension, the membrane is in virtual contact with the cathode and the adjacent plastic surface thus providing a relatively thin film of electrolyte in the area of the cathode 45. Since the membrane is deformable, the electrolyte produces a relatively small separation between the opposed surfaces of the membrane and the working face, the magnitude of this separation is determined by the liquid constant, which is a function primarily of the nature of the liquid, and the counter-force provided by the membrane. In this way, the thickness of electrolyte is maintained at a minimum to provide relatively fast response and assists in promoting rapid recovery in the event of mechanical shock.

Further, since the ring cathode is positioned near the peripheral edge of the sensor and because the membrane is under tension, and due to the relatively thin film of electrolyte opposite the cathode ring, it has been observed that the sensor cell is relatively stable to mechanical shock, exhibits relatively fast recovery from such shock and the overall response time is faster.

It has been observed that the material of one electrode, for example, the one that becomes the active material in the reaction by which oxygen is measured, is deposited on or near the other electrode, i.e., the cathode. Heretofore, the practice had been periodically to remove the membrane and the electrolyte and to rinse out the cell and to add new electrolyte followed by recalibration of the sensor cell against a standard. In the case of a sensor utilizing a silver anode, the chemical nature of the deposit and the rate of deposition thereof appears to be a function of the structure of the sensor cell, the electrical conditions imposed upon the cell and the composition of the electrolyte used. In the case of a sensor of the type above described utilizing a silver anode, silver or a silver compound or compounds appear to form in the vicinity or on the cathode. The deposit appears to grow radially from the edge of the cathode toward the anode, and in time may bring about an electrical short from the anode to the cathode thus rendering the sensor cell inoperative.

Additionally, the plating out of the deposit from the electrolyte solution is accompanied by a flow of current which introduces a variable error in the sensor signal.

While the exact mechanism which tends to bring about deposition of anodic material or compounds thereof at the cathode is not fully understood, it is believed attributable in part to the over-voltage applied across the anode and cathode and the difference in specific electrical resistance in that portion of the electrolyte immediately adjacent the anode and the relatively thin portion thereof in the area of the cathode. The combined results of these two factors apparently favors anodic deposition on the working face immediately adjacent the cathode, the material being conductive in nature and exhibiting a tendency to deposit radially inwardly of the cathode and finally contacting the anode.

In instances in which silver is used as the anode, which is preferred in accordance with the present invention, metallic silver tends to be deposited at the cathode. One feature of the present invention is to control the area of deposition of the metallic anode material in the vicinity of the anode so that it becomes part of the anode if any deposition occurs. Referring specifically to FIG. 2, the portion of the working face 14 constituting the annular land 42 between the anode 35 and the cathode 45 is provided with a groove 55 which is preferably continuous and annular in shape and concentrically arranged with respect to the anode and cathode which are also preferably disposed in concentric relation to each other.

The groove 55 functions to increase the cross-sectional thickness of the electrolyte layer and provides a generally annular shoulder 56 between the well 30 and the groove 55 with a second annular shoulder 58 between the groove 55 and the cathode 45. With this construction of sensor cell, any deposition of anodic material which tends to take place occurs between the opposed surface of the membrane 20 and the annular shoulder 56 as shown at D. Evidently this is attributable to the fact that the voltage profile across the working face of the sensor cell tends to indicate that the specific voltage opposite the annular shoulder 56 favors deposition of anodic material in that space.

Specifically, dissolved anode material tends to be attracted to the cathode and travels through the electrolyte in the well. As it approaches the annular shoulder 56, the voltage appears to decrease, and then to increase in the area of the groove 55, so that a localized barrier is interposed between the anode and the cathode in which the voltage conditions and the electrically insulating nature of the shoulder apparently favor deposition of anodic material. Once deposits are formed along the working face in the area of shoulder 56, they continue to grow radially towards the anode until the deposit makes electrical contact with the anode. Contact having been made between the deposit and the anode, the deposit becomes part of the anode and the electrochemical action of the sensor tends to consume the deposited material in preference to consumption of the anode proper.

The provision of groove 55 in the annular shoulder 42 to provide the concentrically disposed shoulders 56 and 58 offers the advantage of maintaining the electrolyte in a relatively thin film in the area immediately adjacent to the cathode. This particular construction is preferred in order to minimize the distance which must be traversed by the constituent being measured in its travel to the cathode. For example, the groove 55 might be extended radially so that the inner peripheral edge of the cathode is exposed to the groove. Such a construction, however, is less desirable since the inner peripheral edge of the cathode is unsupported and is exposed to electrolyte thus constituting an active cathodic surface. It is believed that exposure of the inner peripheral cathode edge tends to lengthen response time, or make the cell slower in its action because of the greater distance the constituent being measured must travel through the relatively thick layer of electrolyte in order to reach the nearest active cathode surface.

In operation, for example, in the determination of oxygen, the electrolyte 50 provides for flow of electrons in the electrochemical process characteristic of polarography. Oxygen migrates to the cathode and depolarizes it causing a current to flow which is proportional to the amount of oxygen which passes through the membrane 20, which in turn is proportional to the pressure of oxygen in the sample being measured.

The sensor cell may be calibrated against a standard following the usual procedure, and in normal usage, the cell of the present invention exhibits a life of about nine months to one year without change of electrolyte and without recalibration.

Referring to FIG. 4, when the cell is connected in a circuit as schematically shown, an applied voltage from battery 60 of about 0.6 to 0.8 volt is maintained across the cell which is connected as indicated in the drawing. A current flows in the presence of the constituent being measured since that substance acts to depolarize one of the electrodes. The circuit shown in FIG. 4 also includes a potentiometer 61 connected to the terminals of the battery and a voltmeter 63 connected between the variable arm 64 of the potentiometer and the positive terminal of the battery. The potentiometer 61 and voltmeter 63 provide for accurate adjustment of the potential difference desired across the sensor cell, usually in the vicinity of 0.8 volt. The cathode is connected to the potentiometer contact on the negative side of battery 60 while the anode is connected to the positive terminal with a galvanometer 65 positioned in the circuit to the cathode. Variations in the current through the sensor cell as indicated by the galvanometer reading will be in proportion to the quantity of substance passing through the membrane 20 and reacting with the electrode of the cell to alter the electrical characteristics thereof, as is well known.

The cell of the present invention may be used with the circuit, device and under the conditions described in my copending application Ser. No. 337,246, filed Jan. 13, 1964, and assigned to the same assignee as this application.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A sensor cell for polarographic analysis of a constituent to be measured comprising:
    an electrically insulating supporting body including a convex working face,
    membrane means supported opposite said face and defining therewith a generally convex chamber of predetermined relatively small cross-sectional thickness,
    said membrane being permeable to the constituent being measured,
    an electrolyte in said chamber,
    an anode electrode supported by said body and in electrical communication with said electrolyte,
    a cathode electrode supported by said body and including an active surface mounted on said working face,
    said cathode electrode being spaced from said anode and in electrical communication with said electrolyte to provide with said anode electrode an electrochemical cell whose electrical characteristics are varied by the constituent being measured,
    said working face including an annular groove between said anode and cathode,
    said anode electrode being consumable during the electrochemical reaction of said cell and said consumed anodic material being capable of depositing on said supporting body and adversely affecting operation of said sensor cell, and
    said annular groove cooperating with said membrane and supporting body to provide an area in said chamber which is of greater cross-sectional dimension than the dimension of said chamber opposite said cathode whereby said consumed anodic material tends to deposit on said working face and spaced from said cathode.

2. A sensor cell for polarographc analysis of a constituent to be measured comprising:
    an electrically insulating supporting body including a generally convex working face,
    membrane means supported opposite said face and defining therewith a generally convex chamber of predetermined relatively small cross-sectional thickness,
    said membrane being permeable to the constituent being measured,
    an electrolyte in said chamber,
    a silver anode electrode supported by said body and in electrical communication with said electrolyte,
    a gold cathode electrode supported by said body and including an active surface mounted on said working face,
    said cathode electrode being generally annular in shape and spaced from said anode and in electrical communication with said electrolyte to provide with said anode electrode an electrochemical cell whose electrical characteristics are varied by the constituent being measured,
    said working face including means between said anode and cathode defining a generally annular land,
    said anode being consumable during the electrochemical reaction of said cell and said consumed anodic material tending to deposit on said annular land adjacent to or on said cathode,
    groove means in said land positioned between said anode and said cathode, and
    said groove means cooperating with said supporting body and said electrode and membrane to promote deposit of said consumed anodic material along a portion of said land spaced from said cathode.

3. A sensor cell for polarographic analysis of oxygen comprising:
    a generally tubular electrically insulating support body including a convex working face,
    means defining a groove around the periphery of said tubular body and spaced from said working face,
    oxygen permeable membrane means positioned over said face and defining therewith a generally convex chamber of predetermined relatively small cross-sectional thickness,
    said membrane being a relatively thin layer of chemically inert fluorinated ethylene propylene,
    an aqueous solution of potassium chloride electrolyte in said chamber,
    means in said supporting body defining a well communicating with said working face,
    a helically wound silver wire anode received in said well,
    means on the working face defining an annular channel having a diameter greater than the diameter of said well,
    said channel cooperating with said well to provide a generally annular land,
    a gold cathode received in said channel and spaced from said anode and in electrical communication with said electrolyte to provide with said anode electrode an electrochemical cell whose electrical characteristics are varied by the constituent being measured,
    said gold cathode including an active generally annular working face opposite and spaced from said membrane,
    said membrane being stretched across said working face whereby the portion thereof opposite said cathode is under tension,
    said silver anode being consumable during the electrochemical reaction of said cell thereby producing conductive silver material capable of depositing on said working face adjacent to and in contact with said cathode and which adversely affects operation of said sensor,
    said land including a generally annular groove therein spaced from said well and said channel and providing a pair of spaced shoulders on said working face opposite said membrane and between said anode and cathode, and
    said groove cooperating with said adjacent shoulders and said anode and cathode to promote deposit of conductive silver material on the soulder between said groove and said anode thereby preventing deposit of said conductive material on or adjacent said cathode.

References Cited

UNITED STATES PATENTS

| | | | |
|---|---|---|---|
| 2,913,386 | 11/1959 | Clark | 204—195 |
| 3,000,805 | 9/1961 | Carritt et al. | 204—195 |
| 3,070,539 | 12/1962 | Arthur et al. | 204—195 |
| 3,071,530 | 1/1963 | Neville | 204—195 |
| 3,098,813 | 7/1963 | Beebe et al. | 204—195 |
| 3,235,477 | 2/1966 | Keyser et al. | 204—195 |
| 3,239,444 | 3/1966 | Heldenbrand | 204—195 |
| 3,278,408 | 10/1966 | Leonard et al. | 204—195 |

HOWARD S. WILLIAMS, *Primary Examiner.*

T. TUNG, *Assistant Examiner.*